Patented Aug. 6, 1935

2,010,226

UNITED STATES PATENT OFFICE 2,010,226

COMPOSITION FOR MOLDING AND PROTECTIVE COATINGS

William Howlett Gardner, New York, N. Y., assignor to United States Shellac Importers Association, Inc., a corporation of New York No Drawing. Application October 22, 1932, Serial No. 639,041

3 Claims. (Cl. 260—2)

This invention relates to an improved composition of matter incorporating a resin, shellac being preferred, methods of producing it, and improved articles made therefrom. The principal object of this invention, though by no means confined to it, is to form a hard composition which can be used for plastic moldings, or for protective purposes, such as coatings, that has a fusion or softening point considerably higher than compositions that have been prepared from the same base materials.

It is well known that shellac belongs to the heat convertible type of resins, and affords one of the best materials for a base in plastic compositions for molding purposes. Molded articles prepared from shellac are the best known insulators for very high voltage service. One disadvantage in the use of shellac is the fact that most of its products have relatively low temperatures of fusion or softening under the application of heat, which is a marked disadvantage when certain engineering and safety features are considered.

According to my invention, I employ a biguanide added to the resinous material, shellac in the example below, and subject the same to heat, or heat and pressure, according to the product desired, in order to form a binding or a base material or a hard, insoluble object, for example, a molded object, the point of fusion of which is substantially raised over the resin in its original form.

Improved shellac compositions have been prepared by the addition of certain so-called hardening agents (U. S. Patents 1,673,803; 1,673,804; 1,673,805; 1,673,806; 1,673,807; 1,673,808). It is believed these agents such as guanidines, aldehyde ammonia, aminonaphthalene, aromatic secondary amines, and phenols form condensation products with shellac. The exact chemical mechanism is unknown. It is, however, clear and can readily be confirmed that these compounds are limited to about one per cent (1.0%) in the effective amounts which can be used. The maximum amount in no way corresponds chemically to any known total number of chemical group or groups in shellac. Hence, the degree of improvement which can be obtained by such chemicals is decidedly limited in their range of effect, and for certain aforementioned engineering uses, such compositions are unable to meet the demands. Biguanides contain at least two, and possibly three, active amine groups capable of reacting with shellac. These chemicals are excellent agents for improving the properties of shellac and shellac compositions and they may be employed in proportion many times in excess of the limit of about one per cent (1.0%) of the agents specified in the aforementioned patents. A biguanide may be incorporated by solution in alcohol as in the case with the agents specified in the said patents, but can be mixed with the shellac in powdered form and uniformly incorporated by means of hot rolls, or other suitable means.

As an example of my invention in which the valuable agent is added in the production of an improved molding compound, is as follows:—

A mixture of nine pounds of asbestos, three pounds of shellac and two ounces of an alpha orthotolylbiguanide is repeatedly passed and repassed between hot rolls maintained at a temperature sufficient to keep the shellac in the composition molten. When the mixture in this manner has been rendered uniform in distribution, the resulting plastic mass may be pressed into slabs, or so-called biscuits of any desired type or shape. These biscuits may then, if desired, be subjected to a heat curing or baking process. The exact details and conditions of any such intermediate step will, to a large extent, depend upon the nature and service to which the later manufactured article is to be put. This product may then be placed in a mold either in biscuit (by softening on a steam table) or in a powdered form, and subjected to required heat and pressure necessary for forming a hard, insoluble, less fusible object. Where a limited amount of agent and previous heat treatment of the biscuit material has been employed, it may be necessary to cool the mold during the pressing operation. The molding may take place in a number of ways but good results may be obtained by softening the biscuit material at 300° F., placing a slight excess in the mold and subjecting the same to 2700 pounds per square inch. The pressure is not released until the material has cooled to a temperature sufficiently low to be readily handled without deformation.

It is understood that this example in no way limits the method in which the desirable agent, a biguanide, may be added in preparing the composition, nor as to its proportion, the use or manner in which the intermediate baking process is employed, the temperatures and pressure used, nor the use or form which the composition containing a biguanide is to be put to service. All these conditions may be varied in order to obtain desired effects without impairing the product. Instead of asbestos, other types of fillers may be employed and suitable coloring agents may be added for specific purposes.

Shellac to which a biguanide has been added and subjected to heat may be used as a binding agent for a variety of materials or as a plastic cement. In this application, shellac is taken to include all forms of lac, the secretion of the insect *Tachardia lacca*, whether in the raw or refined, or manufactured forms.

It is known that aromatic or cyclic amines can be used as condensing or polymerization agents for resins of the heat convertible type (U. S. Patents 1,342,326; 1,146,388; British Patent 4,154—1909), J. Ind. Eng. Chem. 17, 225 (1925), and these agents are distinct from the agent employed by me which contains two, and possibly three, active amine groups capable of reacting with the shellac, as formation chemicals containing one active group are limited in their field of application.

Having described my application, what I claim and desire to secure by Letters Patent, is as follows:

1. A composition of matter capable of hardening on heating, comprising shellac and alpha-orthotolybiguanide.

2. A composition of matter formed by the application of heat to shellac and alpha-orthotolybiguanide.

3. A method of making molding compositions which comprises adding to shellac alpha-orthotolybiguanide and then subjecting the resulting mixture to heat and pressure.

WILLIAM HOWLETT GARDNER.